United States Patent
Stageberg

[15] 3,650,876
[45] Mar. 21, 1972

[54] ARTICLE POSITIONING AND CONTROL MECHANISM

[72] Inventor: Wilfred E. Stageberg, Minneapolis, Minn.

[73] Assignee: Minnesota Mining and Manufacturing Company, St. Paul, Minn.

[22] Filed: Apr. 18, 1969

[21] Appl. No.: 817,528

[52] U.S. Cl. ............................................... 156/584, 221/73
[51] Int. Cl. ............................................................. B32b
[58] Field of Search ............... 156/361, 540, 344, 384, 584; 221/73

[56] References Cited

UNITED STATES PATENTS

| 3,405,021 | 10/1968 | Marano | 156/361 |
| 3,485,414 | 12/1969 | Dinter | 221/73 |
| 3,425,346 | 2/1969 | Voigt et al. | 156/384 |

FOREIGN PATENTS OR APPLICATIONS

| 172,916 | 9/1960 | Sweden | 156/361 |

*Primary Examiner*—Samuel Feinberg
*Attorney*—Kinney, Alexander, Sell, Steldt & Delahunt

[57] ABSTRACT

An apparatus for registering articles releaseably adhered to a liner with a predetermined station for printing, punching, dispensing, etc. The apparatus includes a movable article guide- and registering-member comprising spaced transversely extending blades engageable with the strip of articles and positioned a predetermined distance from said station such that upon movement of the articles toward said predetermined station and movement of said registering member a predetermined extent the desired position of the articles relative to the station may be readily maintained.

13 Claims, 7 Drawing Figures

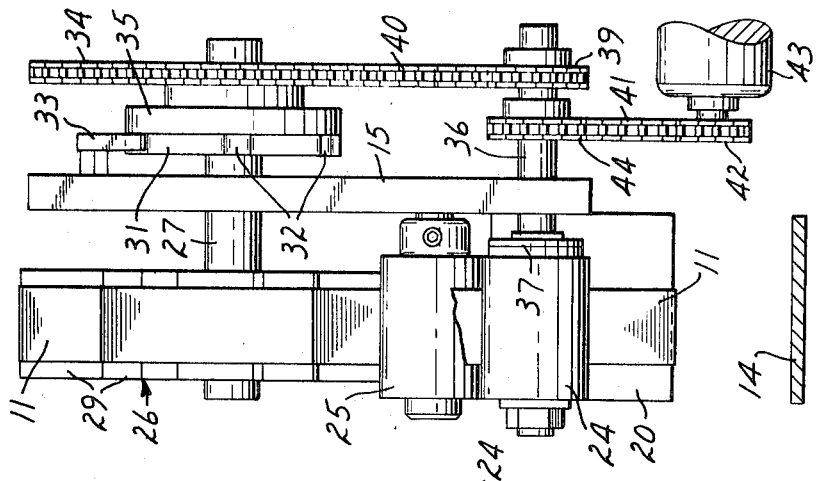
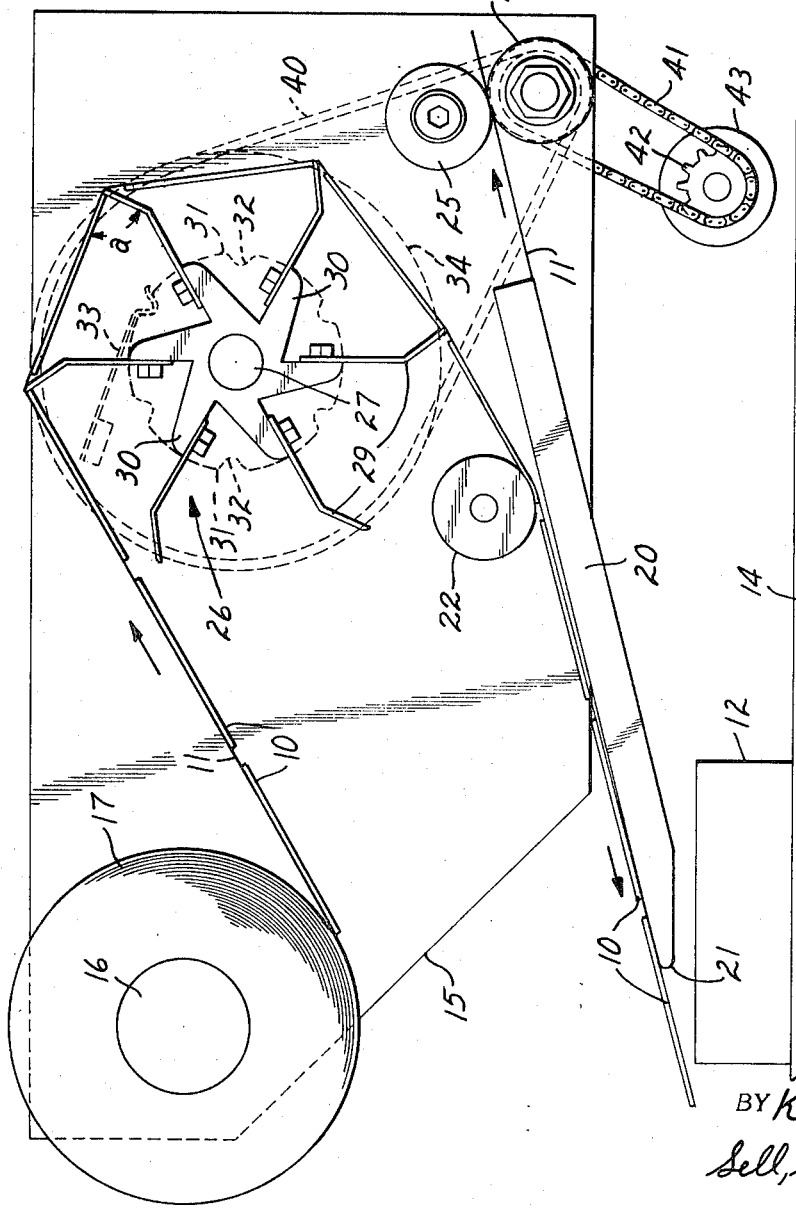

INVENTOR.
WILFRED E. STAGEBERG
BY Kinney, Alexander,
Sell, Steldt & DeLa Hunt
ATTORNEYS

ARTICLE POSITIONING AND CONTROL MECHANISM

This invention relates to an improved positioning or registering apparatus for articles releaseably adhered to a liner and in one aspect to an improved device for registering and positioning labels, releaseably secured by a pressure-sensitive adhesive to a liner, at a predetermined station, for example, a printing station or a dispensing and applicating station.

Many different systems have been utilized to facilitate registration of articles carried by a web at a particular station and one such use is the dispensing of pressure-sensitive adhesive coated labels and applying the same to packages or products as the products are moved along a conveyor line or belt to assure the proper placement of a label on each of the products. Often times the products are moved at a predetermined speed in a predetermined spaced relationship such that the sequential feeding, dispensing, and applying of the labels to the products may be achieved. In other instances, the movement of the products along the line is sporadic, thus the label-dispensing and applicating machine is operated in an intermittent manner in response to each of said products to be labeled reaching the labelling station. In either apparatus however, it is important to time the operation of the dispensing mechanism for the labels with the movement of the articles or products to be labeled to assure that a separated label is positioned, ready or available to be applied on the product when a product is at the labelling station. To accomplish this, there have been many attempts to arrive at an accurate registering mechanism to perform this control function near the applicating station. In the prior art, there are several patents disclosing various types of sensing devices. These U.S. Pat. Nos. includes 2,939,599, issued to Schluter; 2,987,591, issued to Ortenblad; 3,039,516, issued to Vinal; 3,240,652, issued to La Mers; and 3,405,021; issued to Marano.

All of these systems, however, have failed to completely meet the need in controlling of the labels because they either 1) operate precisely but not rapid enough to meet increased demands of labelling equipment; 2) mar or scratch the surface of the label over which they slide or ride; 3) mar the edges of the labels which they engage; 4) fail to detect the presence of thin label stock; and 5) upon rapid operation a harmonic is set up or the speed of movement in the movable sensors is such that the sensors occasionally miss contact with a label.

The device of the present invention has as one of its advantages the versatility of being useable, with minor modifications, for several modes of operation as concerns the product control.

It is a further advantage of the present invention to provide more positive registration even if the articles or labels occasionally overlap or are otherwise unevenly spaced on the liner.

In one mode of operation of the present invention, the registering member is continuously moving, allowing for precise registration at higher speeds since there is no mass to accelerate and decelerate each time it is desired to advance or register a new label at the labelling station.

The present invention, therefore, has the general advantage of providing an improved article-dispensing and registering apparatus.

The feeding and registering device of the present invention comprises means for supporting a supply strip of stock comprising pressure-sensitive adhesive labels adhered releasably to a liner, means defining a path from the supply to a predetermined station to perform a specified function on the item, means for driving the stock along said path by drawing the liner through said station, and an improved registering device for the strip to register the labels with respect to a work station such that a label on the liner will be positioned for treatment at the station, for example, application to a product as a product reaches the labelling station. The improved registering member is positioned between the supply and the station to form a bend in the path of the strip and to guide the strip to the station. The registering member is formed with a plurality of spaced blades having an edge extending transversely, preferably normal to the path of the strip and movable along the path of the strip to contact the liner between the labels and thereby upon registering the position of the blades, determine the position of the labels. The blades are positioned in a predetermined spaced relationship to contact the liner between the labels and the registration member is so positioned relative to the station to properly register a label at said station upon completion of a predetermined movement of said registering member and the blades along the path.

The above will be more fully understood after a perusal of the following detailed description which refers to the accompanying drawings wherein:

FIG. 1 is an elevational view of an apparatus constructed in accordance with the present invention for dispensing and applying labels;

FIG. 2 is a side elevation of the apparatus of FIG. 1;

Figure 3:
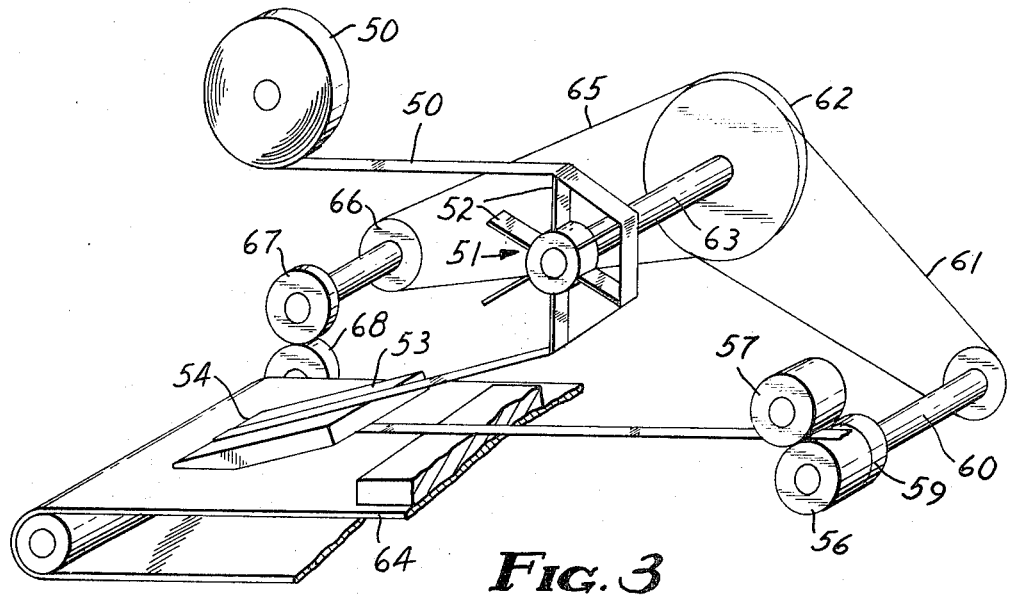
FIG. 3 is a schematic perspective view of an embodiment of the present invention.

The present invention, as aforementioned, finds utility in the registration of labels and there is illustrated in FIG. 1 of the drawing an apparatus for dispensing pressure-sensitive adhesive labels 10 which are releaseably mounted on a liner 11 at a station where they may be applied to an article 12 moved along a line or conveyor 14 in a manufacturing, canning or packaging line in a plant.

The label-dispensing apparatus comprises a frame 15 having means thereon such as the spindle 16 for supporting a supply source of the strip material including the labels 10 and line 11. This source of supply may be in the form of a convolutely would roll 17. The strip of labels is guided from the supply roll 17 along a path partially defined by a platen 20 projecting outward from the frame 15 and inclined relative to the bottom of the frame terminating in a transverse separating edge 21 around which the liner is drawn to dispense the labels 10 from the liner 11 by peeling the liner from beneath the labels. At this edge the label 10 may be applied to the article 12 by means of an applicating or buffing roll or, the label station can be defined by a vertically reciprocating plunger which would receive and hold the dispensed label and move the label down into contact with the product to be labeled. Alternatively, the label could be dispensed onto a vacuum wheel which would carry the label around into contact with the article 12.

The strip material is guided onto the platen 20 by a guide roller 22 and the strip is pulled along the platen 20 and about the edge by having the liner extend back along the underside of the platen 20 through the nip area between a driven roll 24 and a pinch or idling roller 25. The improved guide and registering member, which will hereinafter be designated as a label-registering member 26, is positioned along the path of the label stock between the source of supply and the separating edge and serves to guide the strip and also to register the position of the labels with respect to the separating edge. The label-registering member 26 is mounted for movement to position the strip along the path, such as by rotation about the axis of a shaft 27 upon which the member 26 is supported. The label-registering member 26 comprises a plurality of spaced blade members 29 which terminate in an edge extending transversely of the strip path and which edge has one sharp corner to engage the strip and abut the end of the labels 10. The label-registering member 26 is positioned to form a bend in the path of the strip between the source 17 and the station or separating edge 21. The blades 19, as illustrated in FIG. 1, radiate from a hub 30 which is supported on the shaft 27. In this instance the blades 29 are circumferentially spaced and the blades 29 are formed with a generally radially projecting portion and a rearwardly inclined or trailing end portion forming an obtuse angle with the radial portion. The contact between the edge of the blades and the label stock is preferably such that when the label stock is in contact with the edges of two adjacent blades 29 it is disposed such that the including angle between the label strip and a blade is 90° as illustrated by the angle $\alpha$. Thus the sharp or 90° corner defining the blade edge contacting the label ends will be perpendicular to the label face and the path of travel of the label stock.

The label-registering member 26 may be operated in several ways and as illustrated the shaft 27 can have a registering disk 31 affixed thereto which disk is formed with a plurality of circumferentially spaced notches or detents 32 corresponding in number to the number of blades on the registering member 26 times the number of labels or articles to be disposed on the liner between the blades. In the illustrated embodiment there are six spaced blades 29, a single label is disposed between each of the blades, and thus there are six detents 32 circumferentially spaced about the registering disk. The label-registering member 26 preferably places a constant back tension on the strip of label stock. As illustrated in FIG. 1, a pawl 33 is engageable with the detents. A sprocket wheel 34 is drivingly connected to the shaft 27 through a slip clutch 35 and the sprocket wheel 34 is driven from a shaft 36 connected to the driven roller 24. The driven roller 24 is connected through a slip clutch 37 to the shaft 36 to be driven from the shaft 36. The shaft 36 carries a sprocket wheel 39 which is connected by a chain 40 to the sprocket wheel 34 in such a manner that the sprocket wheel 34 and label-registering member 26 are driven at a speed to move the edges of the blades 29 slower than the linear speed of the strip material driven by roller 24 when the slip clutch 37 is permitted to pull the liner 11 along the path. Thus a constant tension is maintained on the strip of label stock at all times and at least one label and the liner are maintained in engagement with the blades 29. The shaft 36 and driven roller 24 may be initially driven by a chair 41 connecting the output pulley or sprocket 42 of a motor and or motor and gear transmission 43 to a pulley 44 mounted on the shaft 36.

In operation the slip clutch 37 maintains a tension in the strip of label material drawing the same tightly about the blades of the label-registering member 26, and upon movement of a product 12 by a conveyor to the labelling station the product would strike or actuate a conventional product switch (not shown) or product sensing member, affording the release of the pawl 33 from a detent 32 of the registering member to rotate under the driving force of the chair 40 until the pawl 33 again engages a detent 32. As the member 26 rotates the stock is pulled by the drive roll 24 and idler roller 25. The product switch may effect release of the pawl 33 by the operation of a solenoid suitably connected to the pawl or by mechanically lifting the pawl out of engagement with the detent 32.

In another mode of operation an electrically operated stepping clutch can be substituted for the slip clutch 35 between the sprocket wheel 34 and the shaft 27 such that upon actuation of a product switch by the product to be labeled the stepping or indexing clutch will drive the label-registering member 26 through a partial revolution, e.g., 60°. This advances the blades to permit the advance of a label to the station to be applied to a product, to advance a label to permit lamination as the product moves through the station, or to position another label at the station after a previous label has been applied. The alternatives, as concern the relationship of label stock movement and product movement are variable. The stepping clutch for partial revolution can be obtained from Precision Specialties Inc., Pitman, New Jersey, a manufacturer of solenoid actuated wrap-spring clutches with special stop collars for incremental movements less than one revolution. In each instance when the registering member stops the liner is pulled until a label abuts a blade positioning another label at the station.

Referring now to FIG. 3 there is illustrated a further modification of the label dispenser. In this embodiment there is shown a supply of the label stock 50 which is threaded along a predetermined path about a label-registering member 51 having blades 52 guiding the label stock onto the platen 53 and across the transverse separating edge 54 with the liner being moved between a driven roll 56 and an idler roll 57. The driven roll 56 is driven through a slip clutch 59 from a shaft 60 connected by a belt 61 to a pulley 62 carried on a shaft 63 which supports label-registering member 51. The pulley 62 is driven in timed relation with the product conveyor 64 by a belt 65 connected to the pulley 62 and driven through a suitable pulley 66 and rollers or gears 67 and 68 from the conveyor 64 or conveyor drive rollers.

In the embodiment of FIG. 3 the strip of label stock 50 is driven in timed relation with the movement of the conveyor 64 which transmits the articles 12 and affords the proper register of a label with the conveyor belt because the position of the strip of label stock 50 is controlled by engagement of the blades 52 on the label-registering member 51 with the label stock between the successive labels. The provision for the overdrive on the drive roller 56 through the slip clutch 59 is maintained to keep the label stock under tension at all times and into contact with the blades 52 but the contact of the blades 52 with the strip material under this tension maintains the blades in contact with the strip material between successive labels.

This modification prevents the need for accelerating or decelerating either the drive roller 56 to drive the label stock or the label-registering member 51 and a very high speed label applicator is possible where the movement of the articles on the conveyor is also continuous and regular.

It is to be understood however that the speed of label stock 50 does not match that of the conveyor as the labels are generally placed centrally of each article and the articles therefore travel faster than the liner. The normal gear reduction necessary to coordinate the label movement with feeding or conveying means or with other operations, i.e., printing etc., would require only mechanical skill.

As a a further alternative, the pulley 66 or article feeding member could be directly connected to the pulley on the shaft 60 and the label-registering member could be free wheeling except possibly for use of a retarding device, a spring biased pawl and detents, to aid in maintaining tension on the label stock between the label-registering device 51 and the separating edge 54 as the articles to be labeled are advanced.

Figure 4:
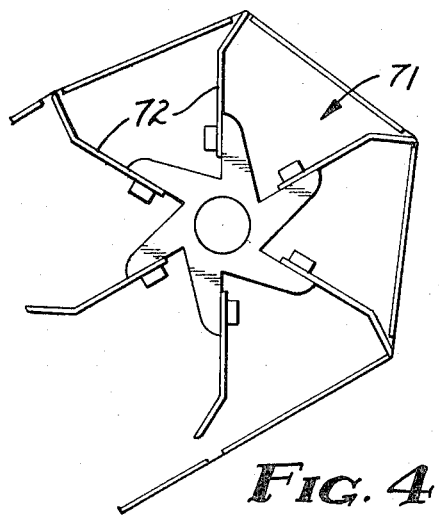
FIG. 4 is a detailed elevational view of a modification of the registering member of the present invention.

FIG. 4 illustrates a further embodiment illustrating a modification of a label-registering member 71 which is formed similar to the label-registering member of FIG. 1 but having end portions of the blades 72 disposed at an angle relative to the radius and in a direction toward the direction of movement of the registering member 71 to afford contact with the liner and the butt or trailing end of one or more labels 10 such that in this form the label-registering member 71 serves to drive the label stock and pull the same from the supply roll and the drive roll for the liner will serve to take up any slack between the label-registering member 71 and the label separating edge. In this form the dispensing mechanism would have a product actuated switch to energize the stepping clutch to drive the registering member 71 in a stepwise manner through an increment of a revolution to draw the label stock from the supply roll and drive the labels concomitantly to place a single label, each time a product to be labeled tripped the switch, at the station.

Figure 5:
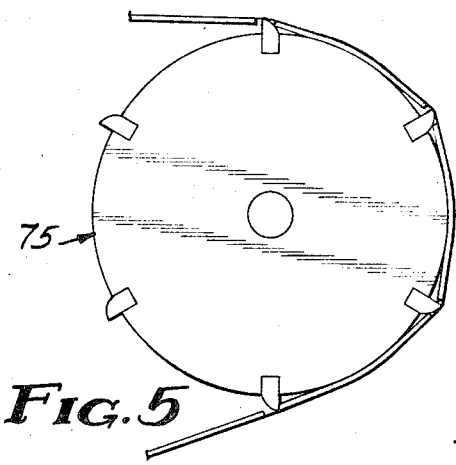
FIG. 5 is a detailed elevational view of a further modification of the registering member of the present invention.

FIG. 5 illustrates a further modification for the label-registering member and a further variation in the mode of operation. In this embodiment a label-registering member 75 has a hub mounted on a shaft with radially extending blades formed with the sharp corner on the edge and the rounded corner. In this embodiment a stepping clutch is utilized and upon a product approaching the labelling station, a switch will be tripped to energize the stepping clutch, allowing the label-registering member 75 to be advanced. In this embodiment the label-registering member has a peripheral speed at the outer ends of the blades exceeding the lineal speed with which the liner and label stock can be advanced by the feed rollers 24 and 25 once the stepping clutch is actuated, such that the member 75 moves through an increment of revolution much faster than the liner is moved the length of one label and will stop, and upon the subsequent advancement of the liner the labels will be pulled across the stationary blades until one or more of the blades again contact the liner between labels and the leading edge of the labels will stop further feed of the liner through the drive roller and slip clutch construction. In this mode there is contact with the face of the labels.

Figure 6:
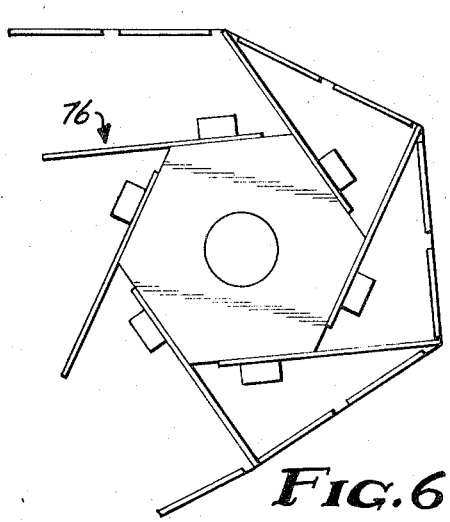
FIG. 6 is a detailed elevational view of a further modification of a registering member of the present invention.

FIG. 6 is a modification of a label-registering member formed with six blades which are disposed on a hexagonal hub supported on a shaft. In this species the registering member 76 has the blades positioned to contact the label stock at an angle of 90° when the label stock is in engagement with two adjacent blades.

Figure 7:
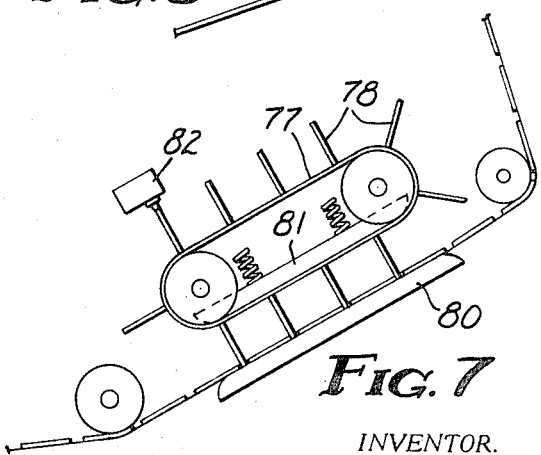
FIG. 7 is a schematic elevational view of a further modification of the registering member according to the present invention.

FIG. 7 illustrates still a further embodiment of the label-registering member, and in this embodiment the registering member takes the form of an endless belt 77 upon which are formed equally spaced transversely extending blades 78. This member is disposed in a position along the path of the label stock 79 between the supply and the separating edge or station and the blades are spaced such that the blades will contact the liner and position the labels in register with the station. In this modification the blades contact the label stock moving along the path defined by a guide 80 and are placed in contact with the stock under the bias of a suitable spring biased shoe 81. The movement of the belt 77 permits movement of the label stock and when the blades and belt stop the label stock will be stopped by contact with the free edge of the blades as in the modifications of FIG. 1. Determining the position of the blades thus determines registration of the labels. The position of the blades on the registering member may be determined by the blades engaging a switch 82 or by an associated cam with lobes corresponding to the number and spacing of said blades actuating a switch or other signaling device.

The registering member of the present invention is formed such that the blades have outer edges successively contacting the ends of the labels on the liner to control, through contact with the ends of the labels, the relative movement and position of the label stock to the registering member and to the station. The blades of the registering member are in a predetermined spaced relation, determined by the label stock and the mode of operation of the registering member. The spacing between the member 26 and the station or edge 21 along the strip path is also predetermined. Thus, there are certain parameters which aid in designing the registering member. Each blade must have an outer strip engaging edge portion thin enough to enter the space between two successive labels on the liner 11. The edge will preferably contact the liner when label stock is being registered as opposed to thicker articles. The dimension C between the edge of one blade contacting the label to the effective edge of the next blade is not the same as the distance L between a given point on one label to the same point on an adjacent label (the term "label" in this discussion represents a functional increment since, as illustrated in FIG. 6, two or more short labels may be accommodated between spaced blades and the increment of movement of the blades will be reduced to register successive shorter labels). The difference D between C and L is generally between 0.010–0.020 inch. The letters D, C and L are used for convenience in description and do not appear on the drawing. Where the registering member is used to resist movement of the label stock (FIGS. 1, 5, and 6), the distance L is greater than dimension C and the tension in the label stock is imbalanced with a greater tension on the strip being between the register member and the station than between the supply and the register member. The dimension C is greater than distance L when the registering member is the driver (FIG. 4), and the tension in the label stock in advance of the registering member is greater than the tension after the registering member. It is also to be noted that it is the blade closest to the station or the blade last to perform any work which is in contact with an article or label on the liner.

While the devices have been described for use with labels adhered to a liner, the registering means may also be used with other emblems, seals, caps or fasteners supported on a web.

In summary, the registering members formed in accordance with the present invention are formed to have blades engaging the strip of material having labels or the like adhered thereto which are to be handled or processed in some manner at an adjacent station. The blades control the movement of the strip by contacting the labels or the like and determine the relative position of these labels or the like with the station by maintaining control over the movement and position of the blades. The article control and/or blade position is determined by the drive means for the registering member, signals being generated by movement of the member or of its blades to a predetermined position, or by a releaseable brake or restraining member holding the blades in fixed locations.

What is claimed is:

1. An article feeding and registering device for use with a strip of labels or the like adhered releaseably to a web comprising means for supplying a said strip from which to be fed, means defining a spaced predetermined process station to which said labels are to be moved, means defining a path for said strip between said supply and said station, and means contacting said strip for advancing said strip, the improvement comprising a movable guide and registering member, said registering member comprising blades each having an outer strip engaging edge with each said edge being substantially equally spaced from adjacent blade edges and extending transversely across the width of said path to contact the strip, said registering member being positioned in a predetermined spaced relationship along said path with said station on one side and said means for supplying a said strip on the other side and being positioned to afford continuous simultaneous engagement of at least two of said blade edges with said strip along said path, means for maintaining a greater tension on a said strip along said path on one side of said registering member than on the other, and means mounting said registering member to afford continuous movement of said blades in one direction in relationship to said path, and for controlling the movement of said blades along said path for determining the relative position of the labels or the like of said strip with said station as said strip is advanced along said path.

2. The article feeding and registering device of claim 1 wherein said strip guide and registering member comprises a hub mounted for rotation and said blades extend from said hub with at least the end portions thereof being disposed at an angle to the radius and with said edges being parallel to the axis of said hub.

3. The article feeding and registering device of claim 1 wherein said strip guide and registering member comprises an endless member with said blades projecting therefrom, the edge of each of said blades having a sharp corner and a smooth surface such that the edge will contact an end of a said label or the like.

4. The article feeding and registering device of claim 1 wherein said means for controlling said blades comprises an incremental stepping clutch to transfer a driving force to said registering member affording stepped motion to said blades through a predetermined distance.

5. The article feeding and registering device of claim 1 wherein said means for controlling said blades comprises a releaseable brake member for stopping movement of said blades after movement thereof a predetermined distance along said path.

6. The article feeding and registering device of claim 1 wherein said means affording control of said blades comprises a switch for producing a signal indicating the position of a said blade, said switch being mounted for actuation upon predetermined movement of said registering member.

7. The article feeding and registering device of claim 2 wherein said means for controlling said blades comprises an incremental stepping clutch to transfer a driving force to said registering member affording stepped motion to said blades through a predetermined distance.

8. The article feeding and registering device of claim 2 wherein said means for controlling said blades comprises a releaseable brake member for stopping movement of said blades after movement thereof a predetermined distance along said path.

9. The article feeding and registering device of claim 2 wherein said means for controlling said blades comprises a switch for producing a signal indicating the position of a said blade, said switch being mounted for actuation upon predetermined movement of said registering member.

10. A label registering device for successively placing labels in a predetermined position at a station, said device comprising in combination:
   1. a liner having a plurality of spaced labels releaseably adhered to one side of said liner;
   2. means engaging said liner for continuously applying an advancing force on said liner to move the same toward said station;
   3. a registering means operatively engageable with said liner for retarding the movement of said liner toward said station induced by said means engaging said liner, said registering means including a movable means having a plurality of blades secured about the periphery of said movable means, said blades terminating in edges for engaging said one side of said liner between said spaced labels, said edges being spaced so that the dimension between the label engaging edges of two adjacent blades is not equal to the distance between two identical points of two adjacent labels, means mounting said movable means to afford continuous movement in one direction, and said movable means being positioned relative to said liner and labels to afford continuous simultaneous engagement of at least two of said blades with said liner and labels; and
   4. means defining a station for separating said labels from said liner for successively placing said labels on a product moving through said station.

11. A device according to claim 10 wherein said movable means includes a hub and a plurality of blades secured about the periphery of said hub and said device includes means for controlling the rotational movement of said hub.

12. A device according to claim 11 wherein said dimension is greater than said distance and said means for controlling the rotational movement comprises drive means for said hub.

13. A device according to claim 11 wherein said dimension is less than said distance and said means for controlling the rotational movement comprises means for retarding movement of said hub.

* * * * *

UNITED STATES PATENT OFFICE
CERTIFICATE OF CORRECTION

Patent No. 3,650,876      Dated March 21, 1972

Inventor(s) Wilfred E. Stageberg

It is certified that error appears in the above-identified patent and that said Letters Patent are hereby corrected as shown below:

Col. 3, line 5, "cluding" should be -- cluded --.

Col. 3, line 46, after "registering" the words -- disk 31. Release of the pawl, permits the label-registering -- should be added.

Signed and sealed this 9th day of January 1973.

(SEAL)
Attest:

EDWARD M. FLETCHER, JR.
Attesting Officer

ROBERT GOTTSCHALK
Commissioner of Patents